(12) United States Patent
Norris et al.

(10) Patent No.: US 12,395,257 B2
(45) Date of Patent: Aug. 19, 2025

(54) SYSTEMS AND METHODS FOR PROVIDING A PROPAGATION PREDICTION TOOL

(71) Applicant: L3Harris Global Communications, Inc., Melbourne, FL (US)

(72) Inventors: James A. Norris, Fairport, NY (US); John W. Nieto, Rochester, NY (US); Edward Wronka, Livonia, NY (US)

(73) Assignee: L3Harris Global Communications, Inc., Melbourne, FL (US)

(*) Notice: Subject to any disclaimer, the term of this patent is extended or adjusted under 35 U.S.C. 154(b) by 323 days.

(21) Appl. No.: 18/333,044

(22) Filed: Jun. 12, 2023

(65) Prior Publication Data
US 2024/0413917 A1    Dec. 12, 2024

(51) Int. Cl.
*H04W 84/18* (2009.01)
*H04B 17/382* (2015.01)
*H04B 17/391* (2015.01)

(52) U.S. Cl.
CPC ....... *H04B 17/3913* (2015.01); *H04B 17/382* (2015.01); *H04W 84/18* (2013.01)

(58) Field of Classification Search
CPC .. H04B 17/3913; H04B 17/382; H04W 84/18
USPC .................................................. 455/67.14
See application file for complete search history.

(56) References Cited

U.S. PATENT DOCUMENTS

| | | | |
|---|---|---|---|
| 9,699,663 B1 | 7/2017 | Jovancevic | |
| 10,003,379 B2 | 6/2018 | Flood et al. | |
| 11,032,148 B2 * | 6/2021 | Sweet, III | G07C 5/008 |
| 12,045,601 B1 * | 7/2024 | Fortenberry | G06F 8/65 |
| 2003/0203717 A1 * | 10/2003 | Chuprun | H04B 7/18591 455/12.1 |
| 2020/0153410 A1 * | 5/2020 | Nielsen | H03H 9/6433 |
| 2020/0310437 A1 * | 10/2020 | Kumar | G05D 1/0212 |
| 2022/0058309 A1 * | 2/2022 | Safira | B60W 60/001 |
| 2022/0212700 A1 * | 7/2022 | Siriwongpairat | H04W 52/367 |
| 2022/0385444 A1 * | 12/2022 | Yue | H03L 7/0812 |

(Continued)

FOREIGN PATENT DOCUMENTS

EP    2943026    11/2015

*Primary Examiner* — April G Gonzales
(74) *Attorney, Agent, or Firm* — Fox Rothschild LLP; Carol E. Thorstad-Forsyth

(57) ABSTRACT

Systems and methods for operating a communication device in the field. The methods comprising: initiating a field test to obtain first radio communication profiles with throughputs supporting mission requirements; performing a first transmission cycle of the field test that involves iteratively transmitting first signals in a same first bandwidth respectively using different modulation schemes or respectively in different bandwidths using a same first modulation scheme; performing a second transmission cycle of the field test that involves iteratively transmitting second signals in a same second bandwidth respectively using the different modulation schemes or respectively in the different bandwidths using a same second modulation scheme; receiving link condition data from the other communication devices that received the first and second signals; generating the first radio communication profiles based on the first and second link condition data; and configuring a transceiver in accordance a selected one of the first radio communication profiles.

19 Claims, 12 Drawing Sheets

(56) References Cited

U.S. PATENT DOCUMENTS

| | | | |
|---|---|---|---|
| 2023/0146505 A1* | 5/2023 | Muhassin | G01M 11/083 |
| | | | 73/865.6 |
| 2024/0134052 A1* | 4/2024 | Berger | G01S 17/006 |
| 2024/0217540 A1* | 7/2024 | Peterson | G01S 17/931 |
| 2024/0219518 A1* | 7/2024 | Peterson | G01S 7/40 |
| 2024/0219535 A1* | 7/2024 | Jacob | G01M 17/007 |

* cited by examiner

Radio Transmit Scheme 200

Preamble Sequence - 12345

Transmission Cycle 202
1. First Bandwidth (e.g., 5 MHz); First Modulation Type (e.g., BPSK).
2. Second Bandwidth (e.g., 20 MHz); First Modulation Type (e.g., BPSK).
...

Transmission Cycle 204
1. First Bandwidth (e.g., 5 MHz); Second Modulation Type (e.g., QPSK).
2. Second Bandwidth (e.g., 20 MHz); Second Modulation Type (e.g., QPSK).
...

Transmission Cycle 206
1. First Bandwidth (e.g., 5 MHz); Third Modulation Type (e.g., 8-PSK).
2. Second Bandwidth (e.g., 20 MHz to 1800 KHz); Third Modulation Type (e.g., 8-PSK).
...

Transmission Cycle 208
1. First Bandwidth (e.g., 5 MHz); Fourth Modulation Type (e.g., QAM).
2. Second Bandwidth (e.g., 20 MHz); Fourth Modulation Type (e.g., QAM).
...

Link Condition Data 300

Associated With Transmission Cycle 202
1. Acquisition Probability AP1-1, Bit Error Rate BER1-1, Signal-to-Noise Ratio SNR1-1, Received Signal Strength RSS1-1, Interference I1-1, Multipath MP1-1, Background Noise N1-1
2. AP1-2, BER1-2, SNR1-2, SS1-2, I1-2, MP1-2, N1-2
...

Associated With Transmission Cycle 204
1. AP2-1, BER2-2, SNR2-2, SS2-2, I2-1, MP2-1, N2-1
2. AP2-2, BER2-2, SNR2-2, SS2-2, I2-2, MP2-2, N2-2
...

Associated With Transmission Cycle 206
1. AP3-1, BER3-1, SNR3-1, SS3-1, I3-1, MP3-1, N3-1
2. AP3-2, BER3-2, SNR3-2, SS3-2, I3-2, MP3-2, N3-2
...

Associated With Transmission Cycle 208
1. AP4-1, BER4-2, SNR4-2, SS4-2, I4-1, MP4-1, N4-1
2. AP4-2, BER4-2, SNR4-2, SS4-2, I4-2, MP4-2, N4-2
...

FIG. 3

Radio Transmit Scheme 400

Preamble Sequence - 12345

Transmission Cycle 402
1. First Bandwidth (e.g., 5 MHz); First Modulation Type (e.g., BPSK).
2. First Bandwidth (e.g., 5 MHz); Second Modulation Type (e.g.,QPSK)
3. First Bandwidth (e.g., 5 MHz); Third Modulation Type (e.g.,8-PSK).
4. First Bandwidth (e.g., 5 MHz); Fourth Modulation Type (e.g., QAM).
. . .

Transmission Cycle 404
1. Second Bandwidth (e.g., 20 MHz); First Modulation Type (e.g., BPSK).
2. Second Bandwidth (e.g., 20 MHz); Second Modulation Type (e.g., QPSK).
3. Second Bandwidth (e.g., 20 MHz); Third Modulation Type (e.g.,8-PSK).
4. Second Bandwidth (e.g., 20 MHz); Fourth Modulation Type (e.g., QAM).
. . .

FIG. 4

Link Condition Data 500

Associated With Transmission Cycle 402
1. Acquisition Probability AP1-1, Bit Error Rate BER1-1, Signal-to-Noise Ratio SNR1-1, Received Signal Strength RSS1-1, Interference I1-1, Multipath MP1-1, Background Noise N1-1
2. AP1-2, BER1-2, SNR1-2, SS1-2, I1-2, MP1-2, N1-2
3. AP1-3, BER1-3, SNR1-3, SS1-3, I1-3, MP1-3, N1-3
4. AP1-4, BER1-4, SNR1-4, SS1-4, I1-4, MP1-4, N1-4
. . .

Associated With Transmission Cycle 404
1. AP2-1, BER2-1, SNR2-1, SS2-1, I2-1, MP2-1, N2-1
2. AP2-2, BER2-2, SNR2-2, SS2-2, I2-2, MP2-2, N2-2
3. AP2-3, BER2-3, SNR2-3, SS2-3, I2-3, MP2-3, N2-3
4. AP2-4, BER2-4, SNR2-4, SS2-4, I2-4, MP2-4, N2-4
. . .

FIG. 5

List of Recommended Radio Configuration Profiles
600

(for minimum mission requirement that throughput supports 4 audio channels, 1 video channels and 2 data channels)

Radio Configuration Profile 602 (QoS = provides 100 Kbps throughput):
Center Frequency 610 (e.g., 325 MHz within Range 3 MHz – 6 GHz), Bandwidth 612 (e.g., 5 MHz); Modulation Scheme 614 (e.g., BPSK).

(throughput supports, e.g., 4 audio channels, 1 video channel and 2 data channels)

Radio Configuration Profile 604 (QoS = provide 200 Kbps throughput):
Center Frequency 620 (e.g., 150 MHz), Bandwidth 622 (e.g., 20 MHz); Modulation Scheme 624 (e.g., BPSK).

(throughput supports, e.g., 8 audio channels, 1 video channel and 2 data channels)

Radio Configuration Profile 606 (QoS = provide 300 Kbps throughput):
Center Frequency 630 (e.g., 325 MHz), Bandwidth 632 (e.g., 20 MHz); Modulation Scheme 634 (e.g., QPSK).

(throughput supports, e.g., 8 audio channels, 4 video channels and 2 data channels)

Radio Configuration Profile 608 (QoS = provide 500 Kbps throughput):
Center Frequency 640 (e.g., 5 GHz), Bandwidth 642 (e.g., 20 MHz); Modulation Scheme 644 (e.g., QAM).

(throughput supports, e.g., 8 audio channels, 4 video channels and 6 data channels)

FIG. 6

SYSTEMS AND METHODS FOR PROVIDING A PROPAGATION PREDICTION TOOL

BACKGROUND

Description of the Related Art

Interoperable communication networks are often needed to facilitate communications amongst individuals of one or more organizations. Mobile Ad-Hoc Networking (MANET) communications systems support varying degrees of service functionality (e.g., video, voice, position/location/information, network throughput, etc.) due to unknown effects (e.g., multipath, background noise, interference, etc.) which hamper all communications schemes. In the case of MANET systems, the number of and location of network nodes (i.e. the network) is constantly varying which adds additional complexity to any effort to predict the support of the services required by the group using the system. Quality of Service (QOS) is the key component provision of any MANET system.

SUMMARY

The present disclosure concerns implementing systems and methods for operating a communication device in the field. The methods comprise: initiating, by the communication device, a field test to obtain first radio communication profiles with throughputs supporting mission requirements; performing, by the communication device, a first transmission cycle of the field test that involves iteratively transmitting first signals in a same first bandwidth respectively using different modulation schemes or respectively in different bandwidths using a same first modulation scheme; receiving, by the communication device, first link condition data from other communication devices that received the first signals; performing, by the communication device, a second transmission cycle of the field test that involves iteratively transmitting second signals in a same second bandwidth respectively using the different modulation schemes or respectively in the different bandwidths using a same second modulation scheme; receiving, by the communication device, second link condition data from the other communication devices that received the second signals; generating, by the communication device, the first radio communication profiles based on the first and second link condition data (wherein each of the first radio communication profiles has a respective different throughput that supports levels of the mission requirements); configuring a transceiver of the communication device in accordance a selected one of the first radio communication profiles; and/or using the configured transceiver to communicate with other communication devices over a mobile adhoc network.

Each of said first radio communication profiles may be defined by a center frequency, a bandwidth and a modulation scheme. The first and/or second link condition data may include, but is not limited to, an acquisition probability, a bit error rate, a signal-to-noise ratio, a received signal strength, interference, multipath, and/or background noise. The mission requirements may specify a minimum number of audio channels, a minimum number of video channels and/or a minimum number of data channels.

The methods may also comprise: detecting, by the communication device, a trigger event during an in-field operation; and responsive to said trigger event, enabling at least one function of propagation prediction tool software being executed by a processor of the communication device. Initiation of the field test may be facilitated by the enabled at least one function of the propagation prediction tool software. The at least one function of the propagation prediction tool software may be disabled responsive to the transceiver of the communication device being configured. The trigger event may include, but is not limited to, a user-software interaction, presence of the communication device in a first geographic area, movement of the communication device out of the first geographic area, movement of the communication device from a first geographic area to another second geographic area, expiration of given period of time, a time of day, and/or detection of a relatively poor quality of service for wireless communications Additionally or alternatively, the methods may also comprise: obtaining, by the communication device, additional link condition data by analyzing signals communicated over the mobile adhoc network; detecting, by the communication device, when the selected one of the first radio communication profiles no longer supports the mission requirements based on the additional link condition data; and reconfiguring the transceiver of the communication device in accordance with another selected one of the first radio communication profiles, in response to said detecting.

Additionally or alternatively, the methods may also comprise: generating environmental sensor data by sensors of the communication device; inputting the environmental sensor data into a trained machine learning model; generating second radio communication profiles based on predicted link conditions output from the trained machine learning model; and reconfiguring the transceiver of the communication device in accordance a selected one of the second radio communication profiles.

This document also concerns a communication device. The communication device comprises: a processor; and a non-transitory computer-readable storage medium comprising programming instructions that are configured to cause the processor to implement a method for operating an autonomous vehicle. The programming instructions comprise instructions to: initiate a field test to obtain first radio communication profiles with throughputs supporting mission requirements; cause performance of a first transmission cycle of the field test that involves iteratively transmitting first signals in a same first bandwidth respectively using different modulation schemes or respectively in different bandwidths using a same first modulation scheme; obtain first link condition data received from other communication devices that received the first signals; cause performance of a second transmission cycle of the field test that involves iteratively transmitting second signals in a same second bandwidth respectively using the different modulation schemes or respectively in the different bandwidths using a same second modulation scheme; obtain second link condition data received from the other communication devices that received the second signals; generate the first radio communication profiles based on the first and second link condition data; cause a transceiver to be configured in accordance a selected one of the first radio communication profiles; and/or use the reconfigured transceiver to communicate with other communication devices over a mobile adhoc network.

The programming instructions may also comprise instructions to: detect a trigger event during an in-field operation; enable at least one function of propagation prediction tool software being executed by the processor, responsive to said trigger event; and/or disable the at least one function of the propagation prediction tool software responsive to the transceiver of the communication device being reconfigured.

Initiation of the field test is facilitated by the enabled at least one function of the propagation prediction tool software.

Additionally or alternatively, the programming instructions also comprise instructions to: obtain additional link condition data by analyzing signals communicated over the mobile adhoc network; detect when the selected one of the first radio communication profiles no longer supports the mission requirements based on the additional link condition data; and reconfigure the transceiver of the communication device in accordance with another selected one of the first radio communication profiles, in response to said detecting.

Additionally or alternatively, the programming instructions also comprise instructions to: generate environmental sensor data by sensors of the communication device; input the environmental sensor data into a trained machine learning model; generate second radio communication profiles based on predicted link conditions output from the trained machine learning model; and reconfigure the transceiver of the communication device in accordance a selected one of the second radio communication profiles.

BRIEF DESCRIPTION OF THE DRAWINGS

The present solution will be described with reference to the following drawing figures, in which like numerals represent like items throughout the figures.

FIG. 2 provides an illustration of a radio transmit scheme in accordance with the present solution.

FIG. 3 provides an illustration of link condition data corresponding the radio transmit scheme of FIG. 2.

FIG. 4 provides an illustration another radio transmit scheme in accordance with the present solution.

FIG. 5 provides an illustration of link condition data corresponding the radio transmit scheme of FIG. 3.

FIG. 6 shows an illustrative list of recommended radio configuration profiles.

DETAILED DESCRIPTION

Figure 1:
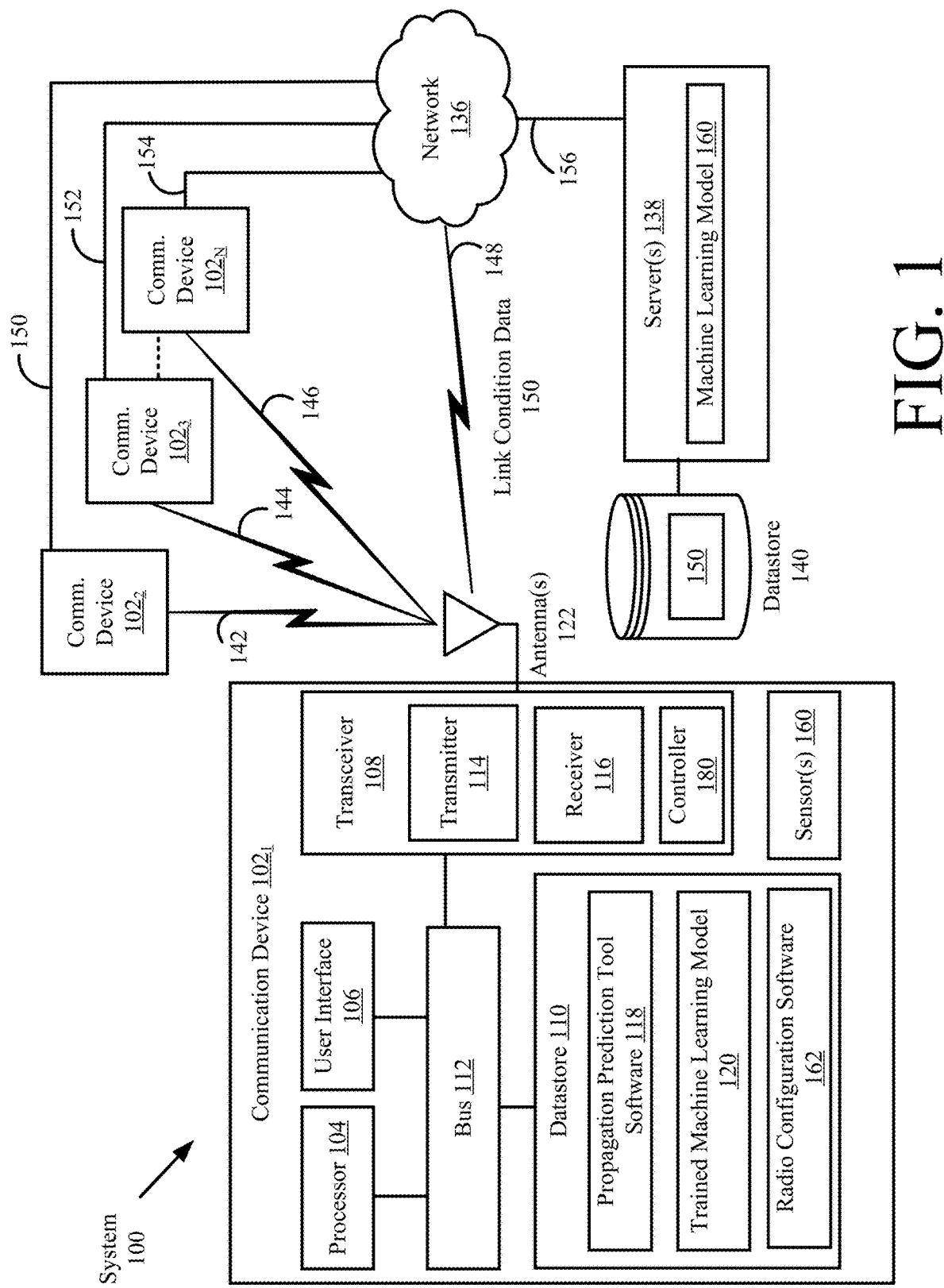
FIG. 1 provides an illustration of a system implementing the present solution.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

In this document, when terms such "first" and "second" are used to modify a noun, such use is simply intended to distinguish one item from another, and is not intended to require a sequential order unless specifically stated.

The present solution generally concerns implementing systems and methods for accurately predicting and measuring those unknown effects which can affect the QoS provided to the users of the MANET system. QoS can be defined as the ability of the network to provide different services to various types of network traffic. The goal of QoS is to achieve a more deterministic network behavior so that data carried by the network can be better delivered and the resources can be better utilized. In wired and wireless networks, there are four typical QoS metrics, namely, bandwidth, delay, delay variance (jitter) and packet loss. In MANETs, service coverage area and power consumption can be added.

The present solution employs a propagation prediction tool for ensuring that the radios are configured in the field to support at least mission requirements (which may be prespecified). The propagation prediction tool advantageously does not implement conventional mathematical models such as an Irregular Terrain model, a Longley-Rice model, an Okumura model, a Hata model, an Egli model, a two-ray ground-reflection model, and/or a Free Space model. The listed mathematical models have certain drawbacks including: an inability to predict time-varying effects like narrowband interferers, elevated city noise, frequency-dependent multipath, etc.; do not easily support frequency hopping (propagation depends on Rx/Tx Frequency); and/or do not support ad-hoc testing or customer demonstrations.

Instead, the propagation prediction tool performs an iterative test in the field to identify communication profiles (e.g., center frequencies, bandwidths, and modulation schemes) that will provide the data throughput supporting at least minimum mission requirements (e.g., A audio channels, V video channels and/or D data channels). The particulars of the iterative test will become evident as the discussion progresses. The communication device then configures or reconfigures its transceiver in accordance with a selected one of the communication profiles. Other communication device may also be caused to configure or reconfigure their transceivers in accordance with the selected one of the communication profiles. The communication profiles are configured to inform users of the MANET as to which center frequencies, bandwidths and modulation schemes can be used given the current environmental conditions to support a desired number of video channels, a desired number of audio channels and/or a desired number of data channels.

Referring now to FIG. 1, there is provided an illustration of a system 100 implementing the present solution. System 100 comprises communication devices $102_1$, $102_2$, $102_3$, ..., $102_N$ (collectively referred to herein as "102") providing nodes in a mobile adhoc network (MANET). Each communication device can include, but is not limited to, a portable communication device or a mobile communication device. The portable communication device can comprise, for example, a laptop computer or a handheld radio. The mobile communication device can comprise, for example, a radio mounted on or in a vehicle (e.g., a truck). The communication devices 102 are configured to communicate with each other via wireless communication links 142, 144, 146. The communication devices 102 may also communicate with remote server(s) 138 via network 136 (e.g., the Internet). These communications can be facilitated by wireless communication links 148 and/or wired communication links 150, 152, 154, 156.

During an in-field operation, communication device $102_1$ detects a trigger event for enabling or otherwise activating one or more disabled or otherwise deactivated functions of RF propagation prediction software 118. The trigger event can include, but is not limited to, a user-software interaction, presence of the communication device in a first geographic area, movement of the communication device out of the first geographic area, movement of the communication device from a first geographic area to another second geographic area, expiration of given period of time, a time of day, and/or detection of a relatively poor QoS for wireless communications (e.g., minimum mission requirements are no longer being supported by the data throughput of a communications link). In response to the trigger event, a processor 104 of the communication device $102_1$ enables or otherwise activates at least one function of the propagation prediction tool software 118 to begin a field test of link conditions.

The field test involves generating a given preamble sequence (e.g., 12345). The preamble sequence is wirelessly communicated from the communication device $102_1$ to the other communication devices $102_2$, $102_3$, ..., $102_N$ in accordance with a known time schedule and radio transmit scheme. In this way, the signal is communicated to communication devices $102_2$ at a first time $t_0$, communication devices $102_3$ at a subsequent second time $t_1$, communication devices $102_N$ at a subsequent third time $t_3$, and so on. The communication devices $102_2$ are programmed to know when they should expect to the signal with the given preamble sequence.

The radio transmit scheme defines one or more cycles of communication settings. An illustrative radio transmit scheme 200 is shown in FIG. 2. The radio transmit scheme involves performing a plurality of transmission cycles 202, 204, 206, 208. Each transmission cycle is associated with a respective modulation scheme of a plurality of modulation schemes. For example, a first transmission cycle 202 is associated with binary phase-shift keying (BPSK). A second transmission cycle 204 is associated with quadrature phase-shift keying (QPSK). A third transmission cycle 206 is associated with phase-shift keying (PSK). A fourth transmission cycle 208 is associated with quadrature amplitude modulation (QAM). Transmission cycles can be additionally or alternatively performed for other modulation schemes.

During each transmission cycle, the communication device $102_1$ iteratively transmits the signal (in which the preamble sequence is modulated onto a carrier wave via the associated modulation scheme) at frequencies in different bandwidths. For example, during transmission cycle 202, the BPSK signal is first transmitted in a first bandwidth (e.g., 5 MHz) and subsequently transmitted in a different second bandwidth (e.g., 20 MHz). In transmission cycle 204, the QPSK signal is first transmitted in the first bandwidth (e.g., 5 MHz) and subsequently transmitted at a frequency in a different second bandwidth (e.g., 20 MHz). Similarly, in transmission cycle 206, the 8-PSK signal is first transmitted in the first bandwidth (e.g., 5 MHz) and subsequently transmitted in a different second bandwidth (e.g., 20 MHz). Likewise, in transmission cycle 208, the QAM signal is first transmitted in the first bandwidth (e.g., 5 MHz) and subsequently transmitted in a different second bandwidth (e.g., 20 MHz). Transmission cycles can be additionally or alternatively performed for other bandwidths.

The present solution is not limited to the radio transmit scheme 200 of FIG. 2. Another radio transmit scheme 400 is shown in FIG. 4. Radio transmit scheme 300 involves performing a plurality of transmission cycles 402, 404. Each transmission cycle is associated with a respective bandwidth of a plurality of bandwidths. For example, a first transmission cycle 402 is associated with a first bandwidth (e.g., 5 MHz), while a second transmission cycle 404 is associated with a different second bandwidth (e.g., 20 MHz). Transmission cycles can be additionally or alternatively performed for other bandwidths.

During each transmission cycle, the communication device $102_1$ iteratively transmits the signal (in bandwidth) using different modulation schemes. For example, during transmission cycle 402, the signal is transmitted a plurality of times in the first bandwidth (e.g., 5 MHZ) using BPSK, QPSK, 8-PSK and QAM. Accordingly, the communication device $102_1$ first transmits a BPSK signal in the first bandwidth, and then transmits a QPSK signal in the first bandwidth. The 8-PSK signal is transmitted in the first bandwidth subsequent the QPSK signal's transmission, the QAM signal is transmitted in the first bandwidth subsequent to the 8-PSK signal's transmission. Similarly, during transmission cycle 404, the signal is transmitted a plurality of times in the second bandwidth (e.g., 20 MHz) using BPSK, QPSK, 8-PSK and QAM. Accordingly, the communication device $102_1$ first transmits a BPSK signal in the second bandwidth, and then transmits a QPSK signal in the second bandwidth. The 8-PSK signal is transmitted in the second bandwidth subsequent the QPSK signal's transmission, the QAM signal is transmitted in the second bandwidth subsequent to the 8-PSK signal's transmission. Transmission cycles can be additionally or alternatively performed for other modulation schemes.

Referring again to FIG. 1, the transmitted signals are respectively received by the communications devices $102_2$, $102_3$, ..., $102_N$ via wireless communication links 142, 144, 146. For example, if radio transmit scheme 400 is employed and transmission cycle 402 is being performed, then the BPSK signal is received by communications devices $102_2$ at a first time t0, the QPSK signal is received by communications devices $102_3$ at a second time t1, the 8-PSK signal is received by the communications devices $102_N$ at a third time t2, and the QAM signal is received by communications devices $102_2$ at a fourth time t3, and so on. Thereafter, the next transmission cycle 404 is performed in which the BPSK signal is received by communications devices $102_2$ at a fifth time t4, the QPSK signal is received by communications devices $102_3$ at a sixth time t5, the 8-PSK signal is received by the communications devices $102_N$ at a seventh time t6, and the QAM signal is received by communications devices $102_2$ at an eighth time t7, and so on. The present solution is not limited to the particulars of this example.

At each communication device, the received signal is analyzed to detect and measure link conditions. The detected and measured link conditions are communicated as link condition data 150 from the receiving communication device $102_2$, $102_3$, ..., or $102_N$ to the transmitting communication device $102_1$. The link condition data 150 can include, but is not limited to, an acquisition probability (AP), a bit error rate (BER), a signal-to-noise ratio (SNR), a received signal strength (RSS), interference (I), multipath (MP), and/or background noise (N). Illustrative link condition data 300 associated with the radio transmit scheme 200 of FIG. 2 is provided in FIG. 3, and illustrative link condition data 500 associated with radio transmit scheme 400 of FIG. 4 is provided in FIG. 5. As can be seen in FIGS. 3 and 5, the receiving communication device detects and measures at least the following link conditions for each signal that it receives: AP, BER, SNR, RSS, I, MP and/or N.

For example, with reference to the field test of FIGS. 2-3, the communication device $102_2$ obtains: link condition values AP1-1, BER1-1, SNR1-1, RSS1-1, I1-1, MP1-1 and N1-1 for the BPSK signal transmitted during transmission cycle 202: link condition values AP2-1, BER2-1, SNR2-1, RSS2-1, I2-1, MP2-1 and N2-1 for the BPSK signal transmitted during transmission cycle 204; link condition values AP3-1, BER3-1, SNR3-1, RSS3-1, I3-1, MP3-1 and N3-1 for the QPSK signal transmitted during transmission cycle 206; and link condition values AP4-1, BER4-1, SNR4-1, RSS4-1, I4-1, MP4-1 and N4-1 for the BPSK signal transmitted during transmission cycle 208. Similarly, communication device $10232$ obtains: link condition values AP1-2, BER1-2, SNR1-2, RSS1-2, I1-2, MP1-2 and N1-2 for the BPSK signal transmitted during transmission cycle 202: link condition values AP2-2, BER2-2, SNR2-2, RSS2-2, I2-2, MP2-2 and N2-2 for the BPSK signal transmitted during transmission cycle 204; link condition values AP3-2, BER3-2, SNR3-2, RSS3-2, I3-2, MP3-2 and N3-2 for the QPSK signal transmitted during transmission cycle 206; and link condition values AP4-2, BER4-2, SNR4-2, RSS4-2, I4-2, MP4-2 and N4-2 for the BPSK signal transmitted during transmission cycle 208. The present solution is not limited to the particulars of this example.

For example, with reference to the field test of FIGS. 4-5, the communication device $102_2$ obtains: link condition values AP1-1, BER1-1, SNR1-1, RSS1-1, I1-1, MP1-1 and N1-1 for the BPSK signal transmitted during transmission cycle 402: and link condition values AP2-1, BER2-1, SNR2-1, RSS2-1, I2-1, MP2-1 and N2-1 for the BPSK signal transmitted during transmission cycle 404. Communication device $102_3$ obtains: link condition values AP1-2, BER1-2, SNR1-2, RSS1-2, I1-2, MP1-2 and N1-2 for the QPSK signal transmitted during transmission cycle 402; and link condition values AP2-2, BER2-2, SNR2-2, RSS2-2, I2-2, MP2-2 and N2-2 for the QPSK signal transmitted during transmission cycle 404. Communication device $102_N$ obtains: link condition values AP1-3, BER1-3, SNR1-3, RSS1-3, I1-3, MP1-3 and N1-3 for the 8-PSK signal transmitted during transmission cycle 402: and link condition values AP2-3, BER2-3, SNR2-3, RSS2-3, I2-3, MP2-3 and N2-3 for the 8-PSK signal transmitted during transmission cycle 404. Communication device $102_2$ or another communication device (not shown in FIG. 1) obtains: link condition values AP1-4, BER1-4, SNR1-4, RSS1-4, I1-4, MP1-4 and N1-4 for the QAM signal transmitted during transmission cycle 402; and link condition values AP2-4, BER2-4, SNR2-4, RSS2-4, I2-4, MP2-4 and N2-4 for the QAM signal transmitted during transmission cycle 404. The present solution is not limited to the particulars of these examples.

After reception by receiver 116 of the communication device $102_1$, the link condition data 150 is passed to the propagation prediction tool software 118 which analyzes the same to generate a list of recommended radio configuration profiles that will provide the QoS necessary for meeting minimum mission requirements. The minimum mission requirements can be defined by a minimum number of audio channels, a minimum number of video channels, and/or a minimum number of data channels. Each radio configuration profile may be defined by a center frequency, a bandwidth and/or a modulation scheme.

An illustrative list 600 of recommended radio configuration profiles is provided in FIG. 6. In the scenario of FIG. 6, the minimum mission requirement is that the throughput supports at least four audio channels, one video channel and two data channels. The propagation prediction tool software 118 analyzes the link condition data 150 and identifies four radio configuration profiles 602, 604, 606, 608 that have throughputs that will support at least the minimum mission requirement. Radio configuration profile 602 has throughput of 100 Kbps which supports four audio channels, 1 video channel and 2 data channels. Radio configuration profile 602 is defined by a center frequency 610 (e.g., 325 MHz within range 3 MHz to GHz), a bandwidth 612 (e.g., 5 MHz), and a modulation scheme 614 (e.g., BPSK). Radio configuration profile 604 has throughput of 200 Kbps which supports eight audio channels, one video channel and two data channels. Radio configuration profile 604 is defined by a center frequency 620 (e.g., 150 MHz), a bandwidth 622 (e.g., 20 MHz), and a modulation scheme 624 (e.g., BPSK). Radio configuration profile 606 has throughput of 200 Kbps which supports eight audio channels, four video channels and two data channels. Radio configuration profile 606 is defined by a center frequency 630 (e.g., 325 MHz), a bandwidth 632 (e.g., 20 MHz), and a modulation scheme 634 (e.g., QPSK). Radio configuration profile 608 has throughput of 500 Kbps which supports eight audio channels, four video channels and six data channels. Radio configuration profile 608 is defined by a center frequency 640 (e.g., 5 GHZ), a bandwidth 642 (e.g., 20 MHz), and a modulation scheme 644 (e.g., QAM). The present solution is not limited to the particulars of FIG. 6.

The list of recommended radio configuration profiles may be output to the user of communication device $102_1$ via output device(s) 106 (e.g., a display screen or speaker). One of the recommended radio configuration profiles may be selected automatically by the propagation prediction tool software 118 or by the user via an input device 106 (e.g., a keypad, virtual button on a touch screen, a physical button, and/or a knob). Other information may be output to the user via output device(s) 106 the link condition data 150, interference analytics, noise analytics, and/or multipath analytics.

Once a radio configuration profile has been selected, the propagation prediction tool software 118 commands the controller 180 to configure or re-configure the transceiver 108 for operating in accordance with the selected radio configuration profile. For example, the controller 180 may be commanded to change a radio frequency, a modulation scheme, a transmit power, and/or an antenna 122 to be used for transmission and/or reception. Once configured or re-configured, the communication device(s) 102$_1$ may begin wireless communications with other nodes in the MANET.

The link condition data 150, list of recommended configuration profiles, and/or selected radio configuration profile may also be communicated to the server(s) 138. This information can be stored in datastore 140 for subsequent use in generating analytics and/or training or updating a machine learning model 160. The trained or updated machine learning model 120 may then be communicated to the communication devices 102$_1$, 102$_2$, 102$_3$, . . . , or 102$_N$ for use in facilitating operational control of transceiver 108.

The trained machine learning model 120 may be used when link condition data 150 is unavailable. Environmental sensor(s) 160 may measure environmental conditions and input environmental data to the trained machine learning model 120. The environmental sensor(s) can include, but are not limited to, temperature sensor(s), humidity sensor(s), location sensor(s), camera(s), and/or speaker(s). The environmental data can include, but is not limited to, temperature data, humidity data, location data, images and/or audio signals. Images captured by camera(s) may be used to detect a terrain type (e.g., forest), cloud cover, and/or man-made obstacles. Audio and/or sounds captured by speaker(s) can be used to determine whether there is lighting or other environmental factors which could affect signal quality.

Datastore(s) 110 of communication device(s) 102 can comprise computer-readable storage medium on which is stored one or more sets of instructions (e.g., software code 118, 120, 162) configured to implement one or more of the methodologies, procedures, or functions described herein. The instructions can also reside, completely or at least partially, within the processor(s) 104 during execution thereof by the communication device(s) 102. Datastore(s) 110 and processor(s) 104 also can constitute machine-readable media. The term "machine-readable media", as used here, refers to a single medium or multiple media (e.g., a centralized or distributed database, and/or associated caches and servers) that store the one or more sets of instructions. The term "machine-readable media", as used here, also refers to any medium that is capable of storing, encoding or carrying a set of instructions for execution by the processor(s) 104 and that cause the processor(s) 104 to perform any one or more of the methodologies of the present disclosure.

Figure 7:
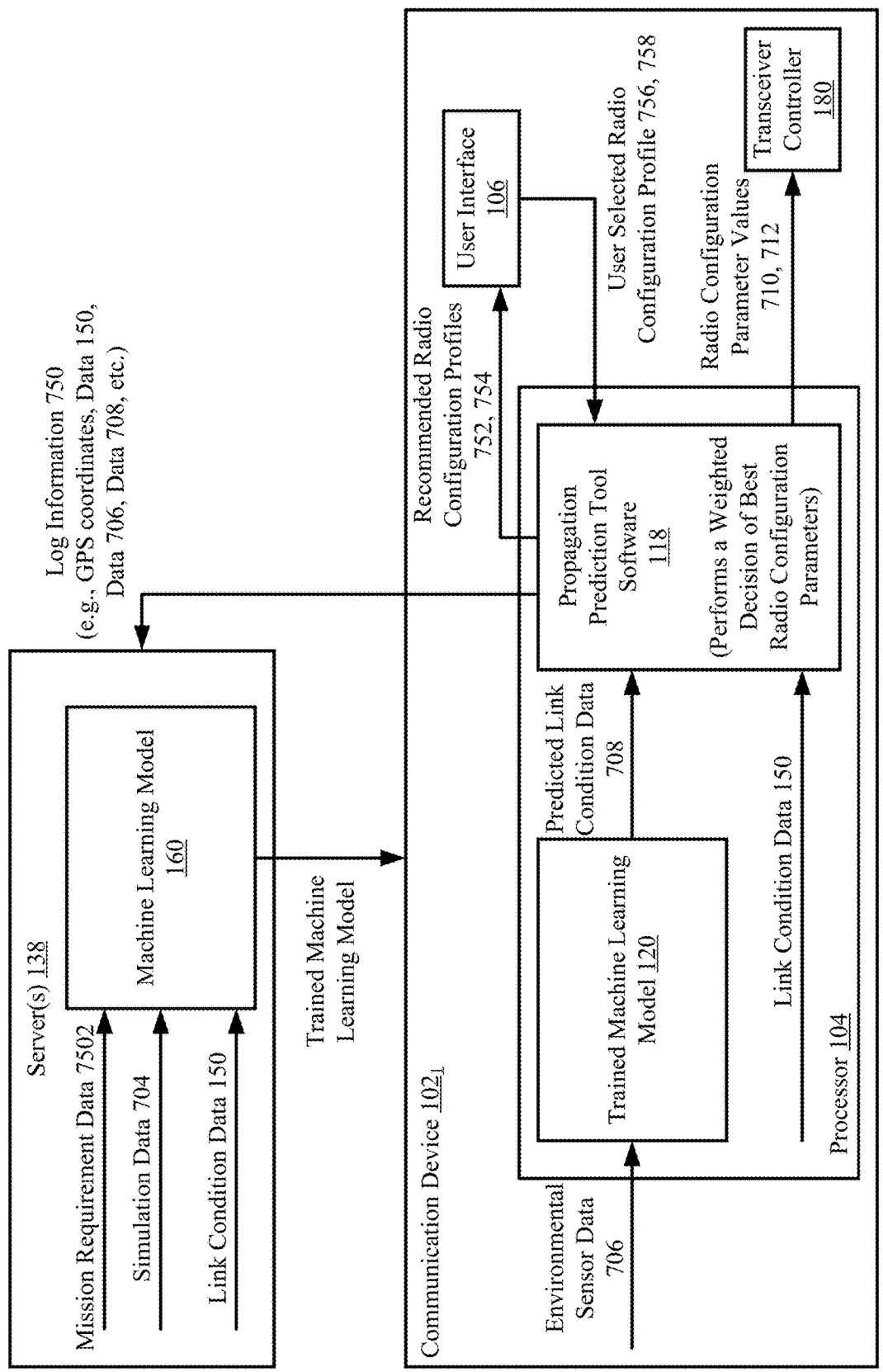
FIG. 7 provides a block diagram that is useful for understanding operations of the system shown in FIG. 1.

An illustration is provided in FIG. 7 which is useful for further understanding how the system 100 operates. As shown in FIG. 7, server(s) 138 use various information to train and/or update a machine learning model 160. This information includes, but is not limited to, mission requirement data 702, simulation data 702, and/or link condition data 150. Any known or to be known simulation data can be employed here. Once the machine learning model has been trained or updated, it is communicated from server(s) 138 to communication device 102$_1$. The machine learning model 120 is stored in a local datastore 110 of the communication device 102$_1$.

During operation, environmental sensor data 706 is generated by sensor(s) 160 of communication device 102$_1$. The environmental sensor data 706 is provided to processor 104 executing the machine learning model 120. The machine learning model 120 is trained to predict link conditions based on the input environmental sensor data 706. The predicted link condition data 708 is provided to the propagation prediction tool software 118. The propagation prediction tool software 118 is configured to perform a weighted decision of best radio configuration parameters based on the predicted link condition data 708. The result of the weighted decision is a list of recommended radio configuration profiles which have associated throughputs supporting at least minimum mission requirement(s). The recommended radio configuration profiles 754 can be the same as, similar to or different than radio configuration profiles 602, 604, 606, 608 of FIG. 6. The recommended radio configuration profiles 752 may be output to the user of the communication device 102$_1$ via the output device(s) of the user interface 106. One of the radio configuration profiles may be selected by the user via the input device(s) of the user interface 106. An identifier of the selected radio configuration profile 756 may then be provided to the propagation prediction tool software 118. The propagation prediction tool software 118 generates radio configuration parameter values 710 in accordance with the selected radio configuration profile 756. The radio configuration parameter values 710 are then provided to the transceiver controller 180 for configuring or re-configuring transceiver 108.

Once configured or re-configured, the communication device(s) 102$_1$ begins wireless communications with other nodes in the MANET. The propagation prediction tool software 118 may continuously monitor link conditions during the MANET communications. If the link conditions no longer support the minimum mission requirement(s), then a field test function of the propagation prediction tool software 118 is initialized, enabled or otherwise activated to obtain link condition data 150 in the manner described above.

The propagation prediction tool software 118 performs a weighted decision of best radio configuration parameters using the link condition data 150. The result of the weighted decision is a list of recommended radio configuration profiles which have associated throughputs supporting at least minimum mission requirement(s). The recommended radio configuration profiles 754 may be output to the user of the communication device 102$_1$ via the output device(s) of the user interface 106. The recommended radio configuration profiles 754 can be the same as, similar to, or different than radio configuration profiles 602, 604, 606, 608 of FIG. 6. One of the radio configuration profiles may be selected by the user via the input device(s) of the user interface 106. An identifier of the selected radio configuration profile 758 may then be provided to the propagation prediction tool software 118. The propagation prediction tool software 118 generates radio configuration parameter values 712 in accordance with the selected data configuration profile 758. The radio configuration parameter values 712 are then provided to the transceiver controller 180 for configuring or re-configuring transceiver 108.

Once configured or re-configured, the communication device(s) 102$_1$ begins wireless communications with other nodes in the MANET. The field test function of the propagation prediction tool software 118 may also be disabled or otherwise deactivated responsive to the configuration or re-configuration of the transceiver 108. However, other function(s) of the propagation prediction tool software 118 may still be enabled or activated. For example, data collection function of the propagation prediction tool software 118 may be enabled for continuously monitoring link conditions during the MANET communications. If the link conditions no longer support the minimum mission requirement(s), then the field test function of the propagation prediction tool software 118 is once again initialized, enabled or otherwise activated to obtain new link condition data in the manner described above.

Referring now to FIG. 8, there is provided a flow diagram of an illustrative method 800 for operating communication device(s) (e.g., communication device $102_1$, $102_2$, ..., $102_N$ of FIG. 1) in accordance with the present solution. Method 800 begins with 802 and continues with 804 where a plurality of communication devices (e.g., communication devices $102_1$, ..., $102_N$ of FIG. 1) are placed in the field or dispatched to a geographic area. A first communication device (e.g., communication device $102_1$ of FIG. 1) detects a trigger event in 806. The trigger event can include, but is not limited to, a user-software interaction, presence of the communication device in the geographic area, expiration of given period of time, or a time of day.

In response to the trigger event, a processor (e.g., processor 104 of FIG. 1) enables or otherwise activates at least a field test function of the propagation prediction tool software (e.g., software 118 of FIG. 1) installed on the first communication device, as shown by 808. Next in 810, the propagation prediction tool software initiates a field test of communication link conditions by the first communication device. The propagation prediction tool software also obtains a radio transmit scheme from a datastore (e.g., datastore 110 and/or 140 of FIG. 1), as shown by 812. The radio transmit scheme can include, but is not limited to, radio transmit scheme 200 of FIG. 2 or 400 of FIG. 4. In 816, a preamble sequence is generated by the propagation prediction tool software.

Thereafter in 818, a transmission cycle (e.g., transmission cycle 202 of FIG. 2 or 402 of FIG. 4) of the field test is started. The transmission cycle is associated with a respective modulation scheme (e.g., BPSK) of a plurality of modulation schemes (e.g., BPSK, QPSK, 8-PSK, QAM, etc.) or a respective bandwidth (e.g., 5 MHz) of a plurality of bandwidths (e.g., 5 MHz, 20 MHz, etc.). In 820, first signals are sequentially transmitted from the first communication device in accordance with the associated modulation scheme(s) or bandwidth(s). For example, a signal is transmitted at time to in a bandwidth (e.g., 5 MHz) which includes the preamble sequence modulated on a carrier wave using a modulation scheme (e.g., BPSK). Another signal is transmitted at time $t_1$ in the same bandwidth which includes the preamble sequence modulated on a carrier wave using a different modulation scheme (e.g., QPSK), and so on. Alternatively, a signal is transmitted at time $t_0$ in a bandwidth (e.g., 5 MHz) which includes the preamble sequence modulated on a carrier wave using a modulation scheme (e.g., BPSK). Another signal is transmitted at time $t_1$ in a different bandwidth (e.g., 20 MHz) which includes the preamble sequence modulated on a carrier wave using the same modulation scheme (e.g., BPSK), and so on.

In 822, the first signals are received by other second communication devices (e.g., communication devices $102_2$, ..., $102_N$ of FIG. 1). The second communication devices analyze the first signals in 824 to obtain first link condition data (e.g., link condition data 150 of FIG. 1). The link condition data is communicated to the first communications device in 826. Subsequently, method 800 continues to block 828 of FIG. 8B.

Block 828 involves starting a next transmission cycle (e.g., transmission cycle 204 of FIG. 2 or 404 of FIG. 4) of the field test. The transmission cycle is associated with a respective modulation scheme (e.g., QPSK) of the modulation schemes (e.g., BPSK, QPSK, 8-PSK, QAM, etc.) or a respective bandwidth (e.g., 20 MHz) of a plurality of bandwidths (e.g., 5 MHz, 20 MHz, etc.). In 830, second signals are sequentially transmitted from the first communication device in accordance with the associated modulation scheme(s) or bandwidth(s). For example, a signal is transmitted at time $t_n$ in a bandwidth (e.g., 20 MHz) which includes the preamble sequence modulated on a carrier wave using a modulation scheme (e.g., BPSK). Another signal is transmitted at time $t_{n+1}$ in the same bandwidth (e.g., 20 MHz) which includes the preamble sequence modulated on a carrier wave using a different modulation scheme (e.g., QPSK), and so on. Alternatively, a signal is transmitted at time $t_n$ a bandwidth (e.g., 5 MHz) which includes the preamble sequence modulated on a carrier wave using a modulation scheme (e.g., QPSK). Another signal is transmitted at time $t_{N+1}$ in a different bandwidth (e.g., 20 MHz) which includes the preamble sequence modulated on a carrier wave using the same modulation scheme (e.g., QPSK), and so on.

In 832, the second signals are received by the second communication devices (e.g., communication devices $102_2$, ..., $102_N$ of FIG. 1). The second communication devices analyze the first signals in 834 to obtain second link condition data (e.g., link condition data 150 of FIG. 1). The link condition data is communicated to the first communications device in 836. As shown by block 838, the operations of blocks 828-836 can be optionally repeated for another transmission cycle (e.g., transmission cycle 206 of FIG. 2). The total number of transmission cycles that are performed is selected in accordance with any given application.

In 840, the first communication device generates a list of recommended radio configuration profiles (e.g., list 600 of FIG. 6) based on the received link condition data. The recommended radio configuration profiles may be output to the user of the first communication device or another device (e.g., server 138 of FIG. 1) via user interface(s) (e.g., user interface 106 of FIG. 1), as shown by 842.

In 844, a transceiver (e.g., transceiver 108 of FIG. 1) of the first communication device is caused to be configured or reconfigured in accordance with a select one of the recommended radio configuration profiles in the list. The radio configuration profile can be selected automatically by the propagation prediction tool software based on certain criteria or by the user via a user-software interaction facilitate by the user interface. The criteria can include, but is not limited to, a number of audio channels specified in mission requirements, a number of video channels specified in mission requirements, a number of data channels specified in mission requirements, historical data indicating communication characteristics in previous missions of a same or similar type as the current mission, time of day, organization associated with the mission, people associated with the mission, geographic location of the mission, and/or throughout thresholds. For example, the propagation prediction tool software may select the radio configuration profile with the greatest throughput, a throughput that exceeds a threshold, a threshold that falls within a threshold range, or a throughput that can support a certain number of audio channels, a certain number of video channels and/or a certain number of data channels. The present solution is not limited to the particulars of this example.

In 846, information (e.g., information 750 of FIG. 7) is logged in a local datastore (e.g., datastore 110 of FIG. 1) of the first communication device or a remote datastore (e.g., datastore 140 of FIG. 1). Next, method 800 continues with 848 of FIG. 8C.

Figure 8A:
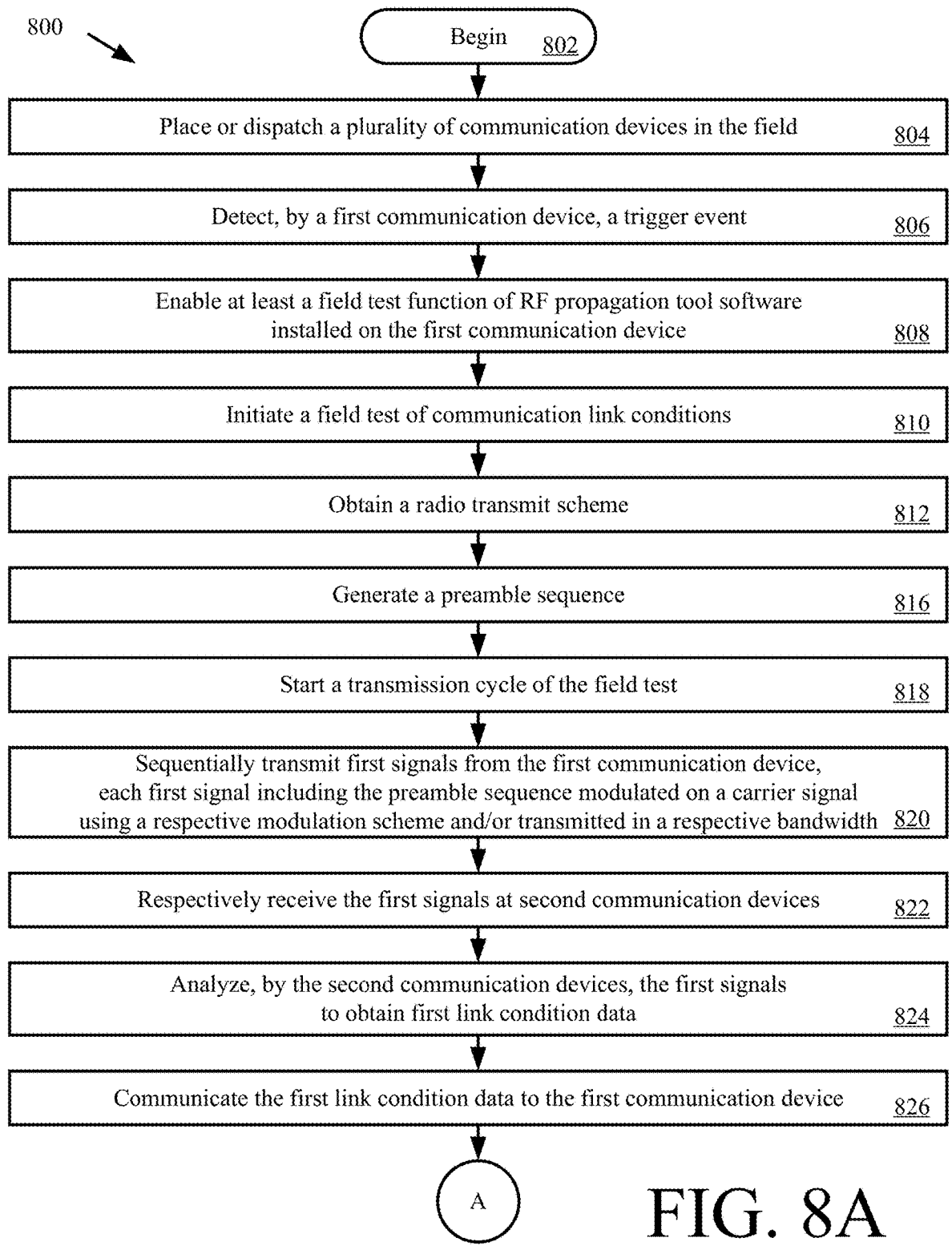
FIGS. 8A-8D (collectively referred to herein as "FIG. 8") provide a flow diagram of an illustrative method for operating communication device(s) in accordance with the present solution.
Figure 8B:
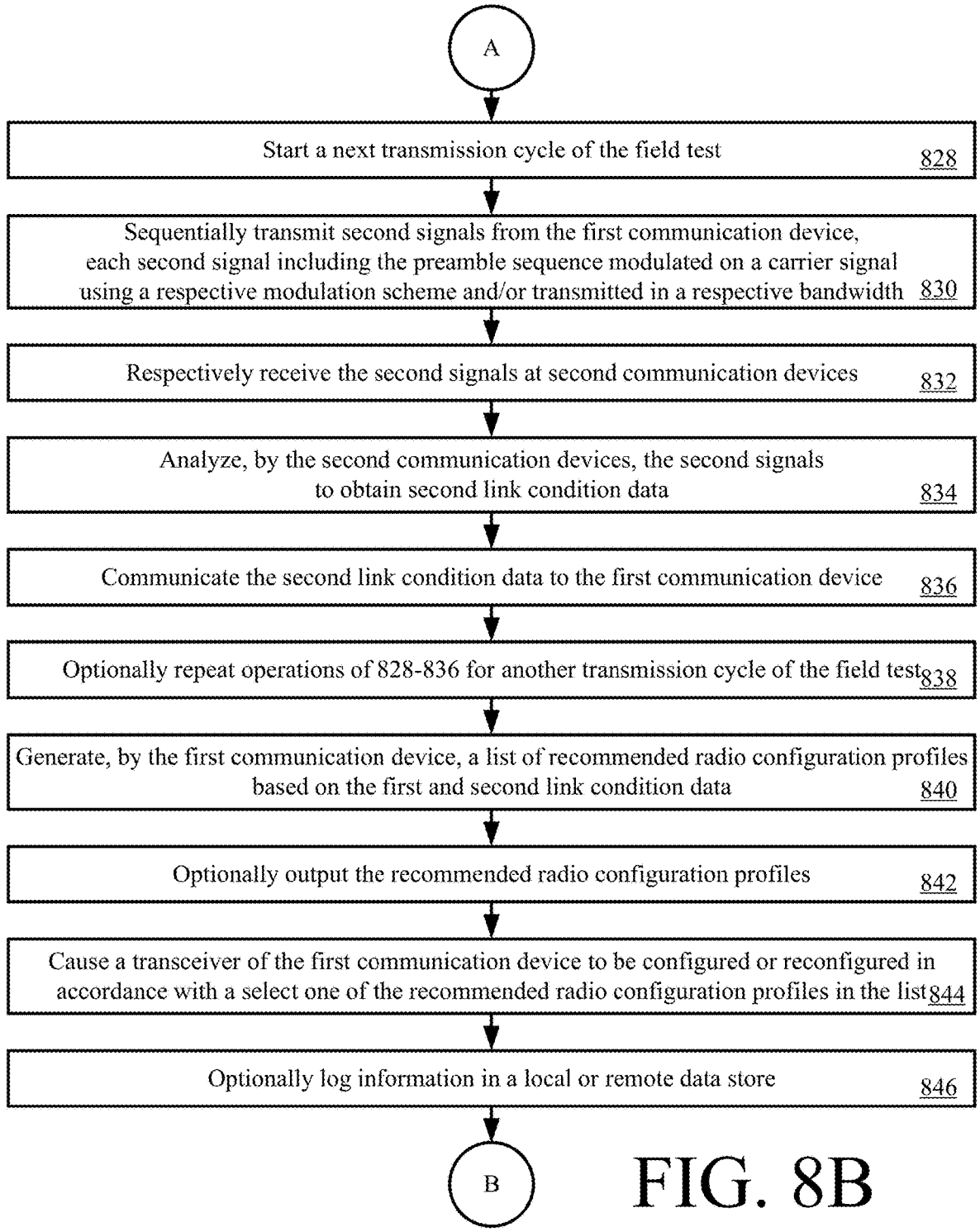
Figure 8C:
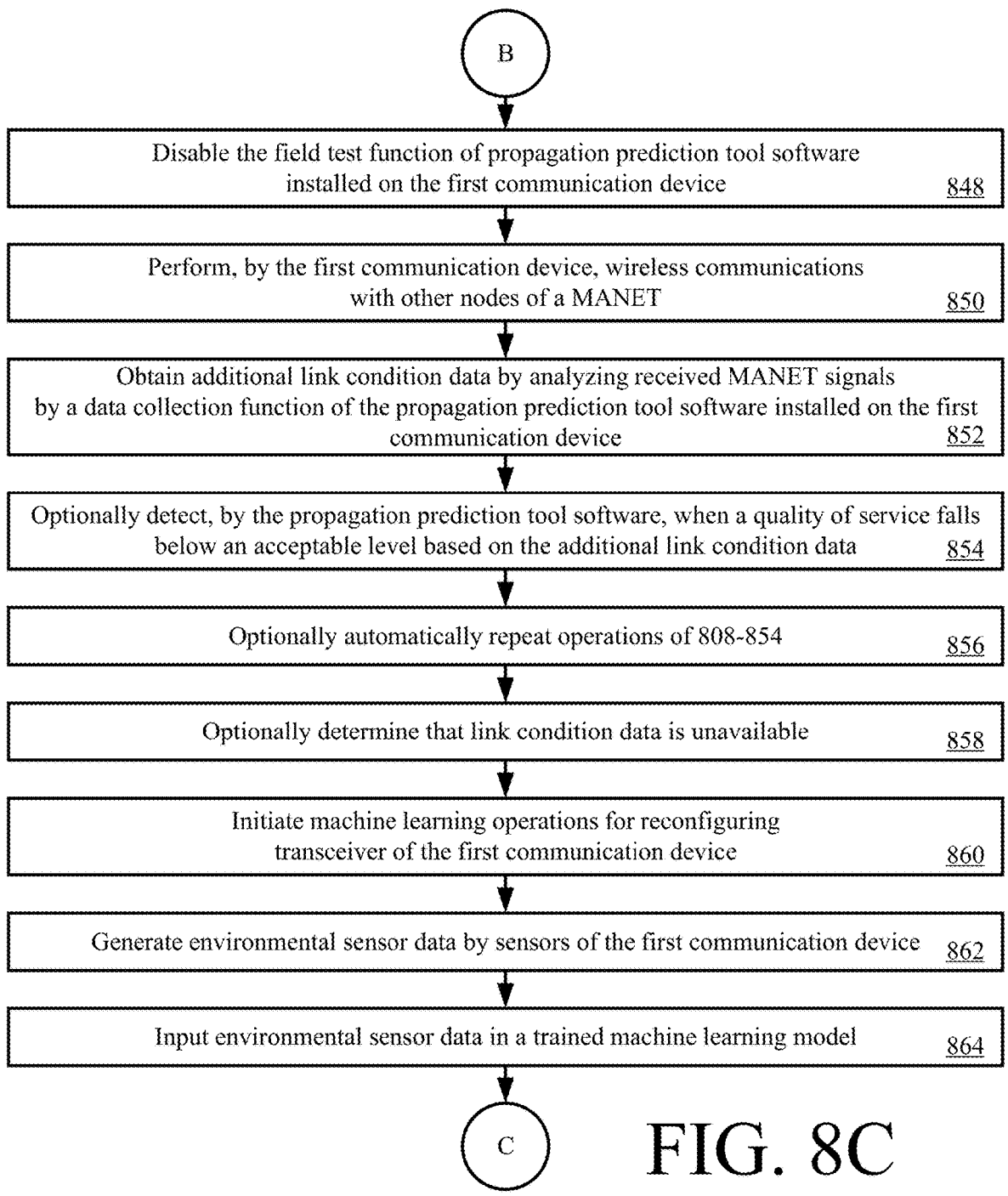

As shown in FIG. 8C, block 848 involves disabling or otherwise deactivating the field test function of the propagation prediction tool software installed on the first communication device. The first communication device may perform wireless communications in 850 with other nodes of a MANET.

While the MANET session is occurring, the propagation prediction tool software performs operations in 852-854 to: obtain additional link condition data by analyzing the MANET signals; and detect when a QoS falls below an acceptable level based on the additional link condition data. The QoS may be considered as falling below an acceptable level when the throughput no longer supports the mission requirements (e.g., a certain number of audio channels, a certain number of video channels and/or a certain number of data channels). In response to this detection, the operations of 808-854 may be automatically repeated to: reconfigure the transceiver of the first communication device in accordance with a radio configuration profile with a throughput supporting the mission requirements; and continue or re-start wireless communications with other nodes of the MANET using the reconfigured transceiver.

In some scenarios, the propagation prediction tool software makes a determination that link condition data is unavailable as shown by block 858. When this occurs, machine learning operations are initiated in 860 for reconfiguring the transceiver of the first communication device. Environmental sensor data (e.g., data 706 of FIG. 7) is generated in 862 by sensor(s) (e.g., sensor(s) 160 of FIG. 1) of the first communication device. The environmental sensor data is input into the trained machine learning model (e.g., machine learning model 120 of FIG. 1) as shown by block 864. Next, method 800 continues with 866 of FIG. 8D.

Figure 8D:
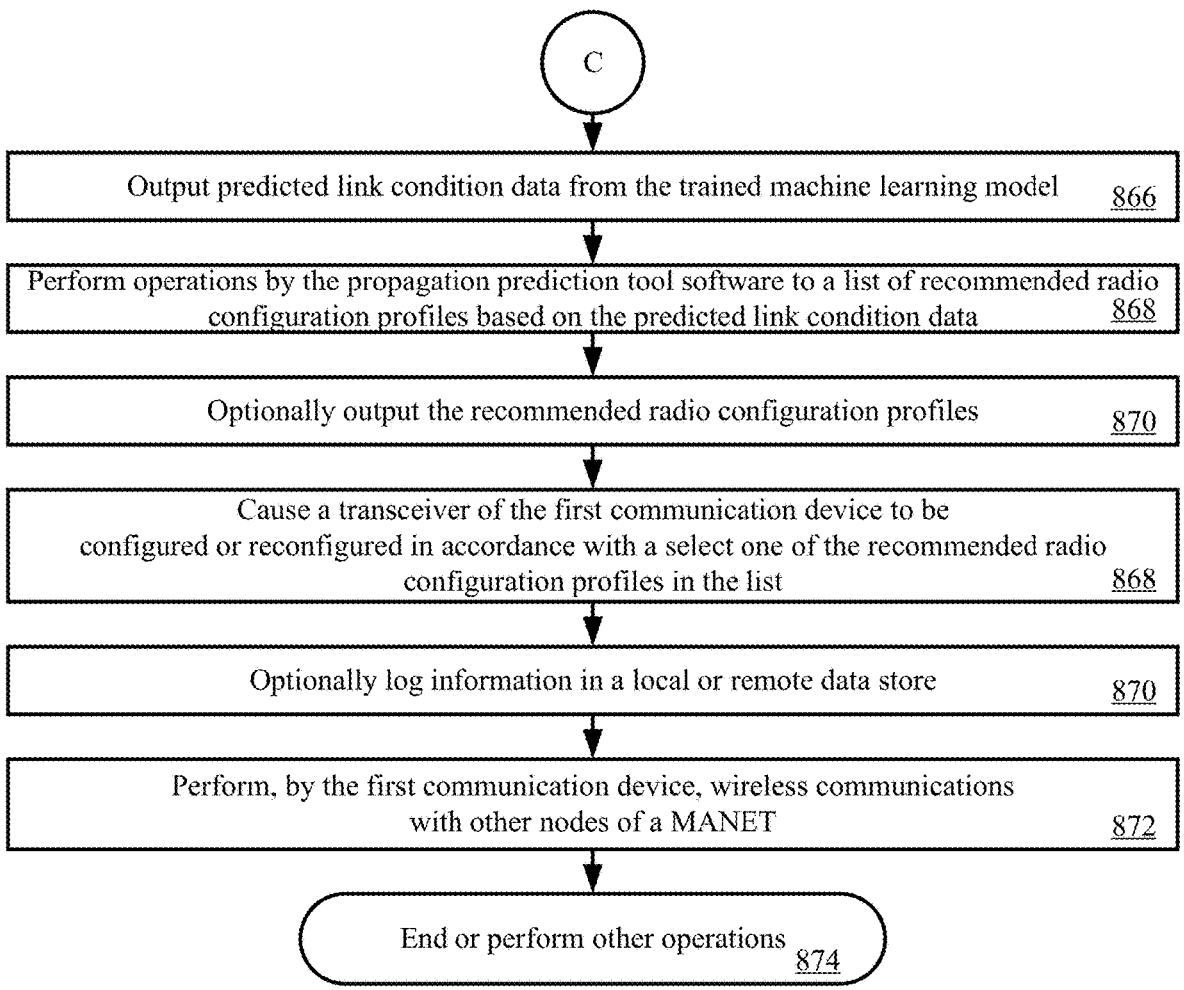

As shown in FIG. 8D, block 866 involves performing operations by the machine learning model to generate predicted link conditions based on the input environmental sensor data. The predicted link conditions are then output from the machine learning model and provided to the propagation prediction tool software. The propagation prediction tool software then performs operations to generate a list of recommended radio configuration profiles (e.g., profiles 752 of FIG. 7) based on the predicted link conditions. The recommended radio configuration profiles may be output to a user of the first communication or a user of another device (e.g., server 138 of FIG. 1). The transceiver of the first communication device is then configured or reconfigured in accordance with a selected one of the recommended radio configuration profiles, as shown by block 868. Information (e.g., information 750 of FIG. 7) may be logged in the local or remote datastore, as shown by block 870. The first communication device may perform wireless communications over the MANET in block 872. Subsequently, operations of block 874 are performed where method 800 ends or other operations are performed (e.g., return to bock 802 of FIG. 8A).

Figure 9A:
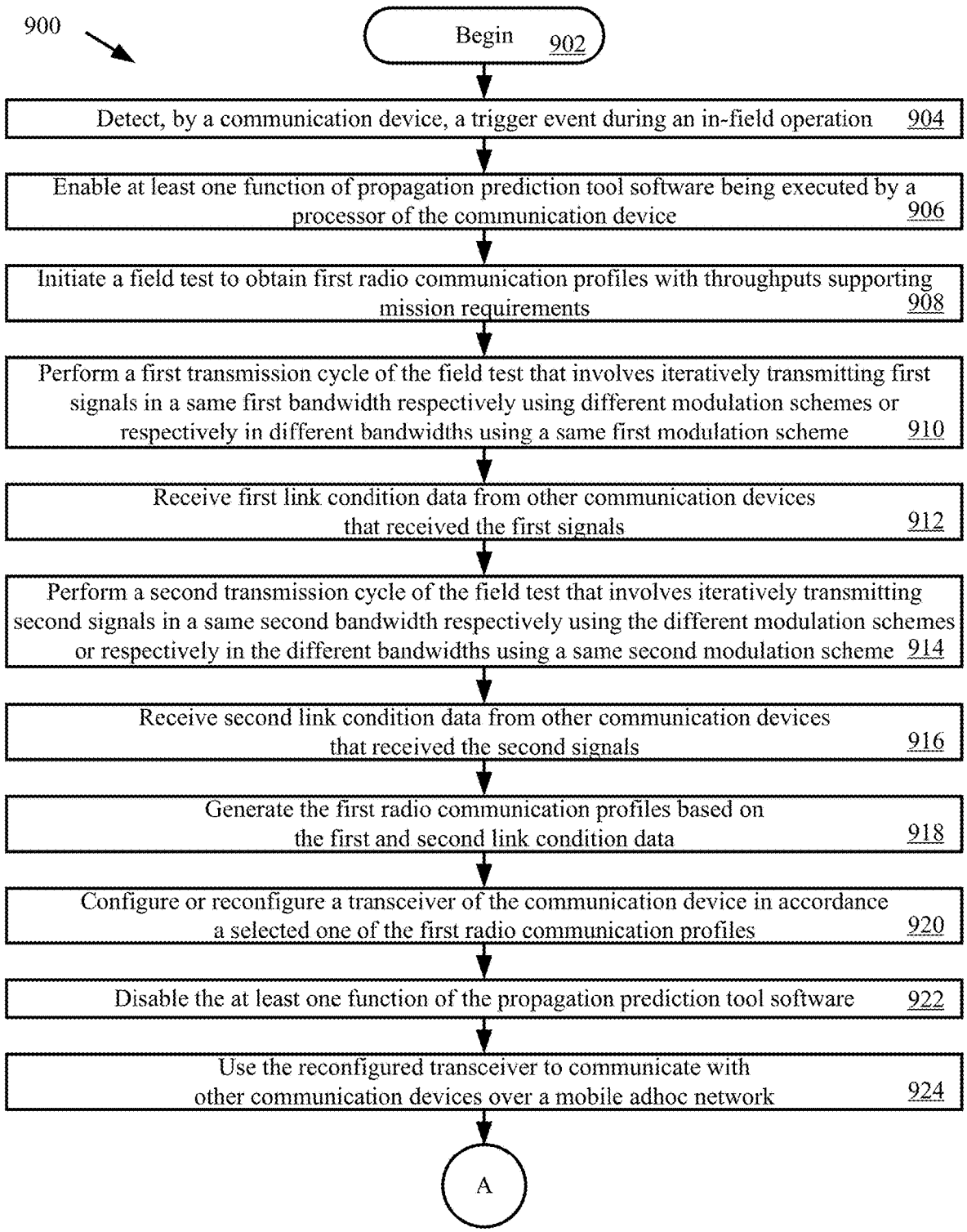
FIGS. 9A-9B (collectively referred to herein as "FIG. 9") provide a flow diagram of an illustrative method for operating a communication device in accordance with the present solution.

Referring now to FIG. 9, there is provided a flow diagram of a method 900 for operating a communication device in the field. Method 900 begins with 902 and continues with 904 where a communication device (e.g., communication device $102_1$ of FIG. 1) detects a trigger event during an in-field operation. The trigger event may include, but is not limited to, a user-software interaction, presence of the communication device in a first geographic area, movement of the communication device out of the first geographic area, movement of the communication device from a first geographic area to another second geographic area, expiration of given period of time, a time of day, and/or detection of a relatively poor quality of service for wireless communications. Responsive to the trigger event, operations are performed in 906 to enable at least one function of propagation prediction tool software (e.g., software 118 of FIG. 1) being executed by a processor (e.g., processor 104 of FIG. 1) of the communication device.

A field test is initiated in block 908 to obtain first radio communication profiles with throughputs supporting mission requirements. Initiation of the field test is facilitated by the enabled at least one function of the propagation prediction tool software. Each of the first radio communication profiles may be defined by a center frequency, a bandwidth, and/or a modulation scheme. The mission requirements may specify a minimum number of audio channels, a minimum number of video channels, and/or a minimum number of data channels.

Next in block 910, the communication device performs a first transmission cycle (e.g., transmission cycle 202 of FIG. 2 or 402 of FIG. 4) of the field test. The first transmission cycle involves iteratively transmitting first signals in a same first bandwidth (e.g., 5 MHz) respectively using different modulation schemes (e.g., BPSK, QPSK, 8-PSK, and QAM) or respectively in different bandwidths (e.g., 5 MHz and 20 MHz) using a same first modulation scheme (e.g., BPSK). The communication device receives first link condition data from other communication devices (e.g., communication devices $102_2$-$102_N$ of FIG. 1) that received the first signals, as shown by block 912. The first link condition data may include, but is not limited to, an acquisition probability, a bit error rate, a signal-to-noise ratio, a received signal strength, interference, multipath, and/or background noise.

In block 914, the communication device performs a second transmission cycle (e.g., transmission cycle 204 of FIG. 2 or 404 of FIG. 4) of the field test. The second transmission cycle involves iteratively transmitting second signals in a same second bandwidth (e.g., 20 MHz) respectively using the different modulation schemes (e.g., BPSK, QPSK, 8-PSK, and QAM) or respectively in the different bandwidths (e.g., 5 MHz and 20 MHz) using a same second modulation scheme (e.g., QPSK). The communication device receives second link condition data from the other communication devices that received the second signals, as shown by block 916. The second link condition data can include, but is not limited to, an acquisition probability, a bit error rate, a signal-to-noise ratio, a received signal strength, interference, multipath, and/or background noise.

In block 918, the communication device generates the first radio communication profiles based on the first and second link condition data. A transceiver (e.g., transceiver 108 of FIG. 1) of the communication device is configured or reconfigured in accordance with a selected one of the first radio communication profiles, as shown by block 920. This configuration or reconfiguration is dynamically performed in the field based on actual link conditions in an environment.

In block 922, the at least one function of the propagation prediction tool software is disabled. The reconfigured transceiver is used in block 924 to communication with other communication device (which may or may not include those that received the first and second signals during the field test) over a mobile ad hoc network. Subsequently, method 900 continues with 926 of FIG. 9B.

Figure 9B:
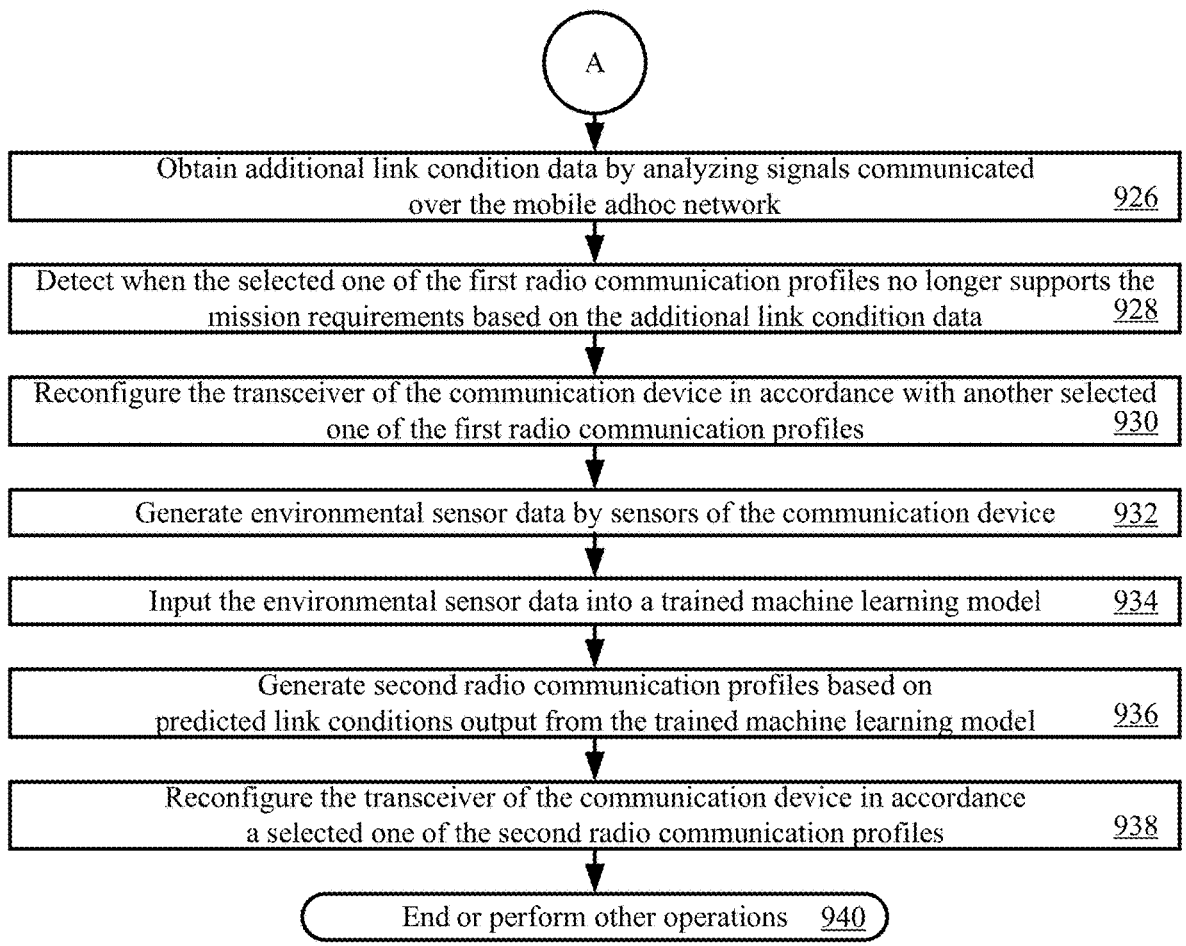

As shown in FIG. 9B, additional link condition data is obtained by analyzing signals communicated over the mobile adhoc network. The communication device may perform operations in 928 to detect when the selected one of the first radio communication profiles no longer supports the mission requirements based on the additional link condition data. The transceiver of the communication device may be reconfigured in block 930 in accordance with another selected one of the first radio communication profile. This first radio communication profile may be selected in the same manner as the previous first radio communication profile.

In 932, sensor(s) (e.g., sensor(s) 160 of FIG. 1) generate(s) environmental sensor data. The environmental sensor data is input into a trained machine learning model (e.g., machine learning model 120 of FIG. 1), as shown by block 934. Second radio communication profiles are generated in bock 936 by the communication device based on predicted link conditions output from the trained machine learning model. The transceiver of the communication device is reconfigured in block 938 in accordance a selected one of the second radio communication profiles. Subsequently, operations of block 940 are performed where method 900 ends or other operations are performed (e.g., return to block 902 of FIG. 9A).

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for operating a communication device in the field, comprising:
    initiating, by the communication device, a field test to obtain first radio communication profiles with throughputs supporting mission requirements;
    performing, by the communication device, a first transmission cycle of the field test that involves iteratively transmitting first signals in a same first bandwidth respectively using different modulation schemes or respectively in different bandwidths using a same first modulation scheme;
    receiving, by the communication device, first link condition data from other communication devices that received the first signals;
    performing, by the communication device, a second transmission cycle of the field test that involves iteratively transmitting second signals in a same second bandwidth respectively using the different modulation schemes or respectively in the different bandwidths using a same second modulation scheme;
    receiving, by the communication device, second link condition data from the other communication devices that received the second signals;
    generating, by the communication device, the first radio communication profiles based on the first and second link condition data, wherein each of the first radio communication profiles has a respective different throughput that supports levels of the mission requirements;
    configuring a transceiver of the communication device in accordance a selected one of the first radio communication profiles; and
    using the configured transceiver to communicate with other communication devices over a mobile adhoc network.

2. The method according to claim 1, wherein each of said first radio communication profiles is defined by a center frequency, a bandwidth and a modulation scheme.

3. The method according to claim 1, wherein the first and second link condition data comprises at least one of an acquisition probability, a bit error rate, a signal-to-noise ratio, a received signal strength, interference, multipath, and background noise.

4. The method according to claim 1, wherein the mission requirements specify a minimum number of audio channels, a minimum number of video channels and/or a minimum number of data channels.

5. The method according to claim 1, further comprising:
    detecting, by the communication device, a trigger event during an in-field operation; and
    responsive to said trigger event, enabling at least one function of propagation prediction tool software being executed by a processor of the communication device;
    wherein said initiating the field test is facilitated by the enabled at least one function of the propagation prediction tool software.

6. The method according to claim 5, further comprising disabling the at least one function of the propagation prediction tool software responsive to the transceiver of the communication device being configured.

7. The method according to claim 5, wherein the trigger event comprises a user-software interaction, presence of the communication device in a first geographic area, movement of the communication device out of the first geographic area, movement of the communication device from a first geographic area to another second geographic area, expiration of given period of time, a time of day, or detection of a relatively poor quality of service for wireless communications.

8. The method according to claim 1, further comprising:
    obtaining, by the communication device, additional link condition data by analyzing signals communicated over the mobile adhoc network;
    detecting, by the communication device, when the selected one of the first radio communication profiles no longer supports the mission requirements based on the additional link condition data; and
    reconfiguring the transceiver of the communication device in accordance with another selected one of the first radio communication profiles, in response to said detecting.

9. The method according to claim 1, further comprising:
    generating environmental sensor data by sensors of the communication device;
    inputting the environmental sensor data into a trained machine learning model;
    generating second radio communication profiles based on predicted link conditions output from the trained machine learning model; and reconfiguring the transceiver of the communication device in accordance a selected one of the second radio communication profiles.

10. A communication device, comprising:
a processor;
a non-transitory computer-readable storage medium comprising programming instructions that are configured to cause the processor to implement a method for operating an autonomous vehicle, wherein the programming instructions comprise instructions to:
initiate a field test to obtain first radio communication profiles with throughputs supporting mission requirements;
cause performance of a first transmission cycle of the field test that involves iteratively transmitting first signals in a same first bandwidth respectively using different modulation schemes or respectively in different bandwidths using a same first modulation scheme;
obtain first link condition data received from other communication devices that received the first signals;
cause performance of a second transmission cycle of the field test that involves iteratively transmitting second signals in a same second bandwidth respectively using the different modulation schemes or respectively in the different bandwidths using a same second modulation scheme;
obtain second link condition data received from the other communication devices that received the second signals;
generate the first radio communication profiles based on the first and second link condition data, wherein each of the first radio communication profiles has a respective different throughput that supports levels of the mission requirements; and
cause a transceiver to be configured in accordance a selected one of the first radio communication profiles.

11. The communication device according to claim 10, wherein each of said first radio communication profiles is defined by a center frequency, a bandwidth and a modulation scheme.

12. The communication device according to claim 10, wherein the first and second link condition data comprises at least one of an acquisition probability, a bit error rate, a signal-to-noise ratio, a received signal strength, interference, multipath, and background noise.

13. The communication device according to claim 10, wherein the mission requirements specify a minimum number of audio channels, a minimum number of video channels and/or a minimum number of data channels.

14. The communication device according to claim 10, wherein the programming instructions further comprise instructions to:

detect a trigger event during an in-field operation; and
responsive to said trigger event, enable at least one function of propagation prediction tool software being executed by the processor;
wherein initiation of the field test is facilitated by the enabled at least one function of the propagation prediction tool software.

15. The communication device according to claim 14, wherein the programming instructions further comprise instructions to disable the at least one function of the propagation prediction tool software responsive to the transceiver of the communication device being reconfigured.

16. The communication device according to claim 14, wherein the trigger event comprises a user-software interaction, presence of the communication device in a first geographic area, movement of the communication device out of the first geographic area, movement of the communication device from a first geographic area to another second geographic area, expiration of given period of time, a time of day, or detection of a relatively poor quality of service for wireless communications.

17. The communication device according to claim 10, wherein the programming instructions further comprise instructions to use the reconfigured transceiver to communicate with other communication devices over a mobile adhoc network.

18. The communication device according to claim 10, wherein the programming instructions further comprise instructions to:
obtain additional link condition data by analyzing signals communicated over the mobile adhoc network;
detect when the selected one of the first radio communication profiles no longer supports the mission requirements based on the additional link condition data; and
reconfigure the transceiver of the communication device in accordance with another selected one of the first radio communication profiles, in response to said detecting.

19. The communication device according to claim 10, wherein the programming instructions further comprise instructions to:
generate environmental sensor data by sensors of the communication device;
input the environmental sensor data into a trained machine learning model;
generate second radio communication profiles based on predicted link conditions output from the trained machine learning model; and
reconfigure the transceiver of the communication device in accordance a selected one of the second radio communication profiles.

* * * * *